(12) United States Patent　　(10) Patent No.:　US 12,638,105 B2

Ball et al.　　(45) Date of Patent:　May 26, 2026

(54) PIPE SUPPORT SYSTEMS

(71) Applicant: WCM Industries, Inc., Colorado Springs, CO (US)

(72) Inventors: William T. Ball, Colorado Springs, CO (US); Eric Pilarczyk, Colorado Springs, CO (US)

(73) Assignee: WCM Industries, Inc., Colorado Springs, CO (US)

( * ) Notice: Subject to any disclaimer, the term of this patent is extended or adjusted under 35 U.S.C. 154(b) by 0 days.

(21) Appl. No.: 18/671,196

(22) Filed: May 22, 2024

(65) Prior Publication Data

US 2024/0392895 A1　　Nov. 28, 2024

Related U.S. Application Data

(63) Continuation of application No. 17/664,257, filed on May 20, 2022, now Pat. No. 12,025,251, which is a continuation of application No. 16/863,849, filed on Apr. 30, 2020, now Pat. No. 11,378,204.

(60) Provisional application No. 62/845,035, filed on May 8, 2019.

(51) Int. Cl.
　*F16L 3/18*　　　(2006.01)
　*F16L 3/02*　　　(2006.01)

(52) U.S. Cl.
　CPC .. *F16L 3/18* (2013.01); *F16L 3/02* (2013.01)

(58) Field of Classification Search
　CPC ....... F16L 7/00; F16L 3/01; F16L 3/16; F16L 3/18; F16L 3/02
　See application file for complete search history.

(56) References Cited

U.S. PATENT DOCUMENTS

| | | | |
|---|---|---|---|
| 1,343,279 A | | 6/1920 | Reynolds |
| 1,435,785 A | * | 11/1922 | Alexander ................ A47F 7/24 |
| | | | 40/607.1 |
| 1,476,473 A | * | 12/1923 | Skinner .................... F16L 3/18 |
| | | | 248/55 |
| 1,541,129 A | | 6/1925 | Farley |
| 1,831,306 A | * | 11/1931 | Kakimoto .............. A01G 25/00 |
| | | | 242/157 R |
| 1,861,436 A | | 6/1932 | Alvin |
| 2,103,811 A | | 12/1937 | Davis |
| 2,384,369 A | | 9/1945 | Gaetano |

(Continued)

OTHER PUBLICATIONS

Big Foot Systems, "Rooftop Building Services Support Systems" Catalog, Mar. 2018, 18 pgs.

(Continued)

*Primary Examiner* — Christopher Garft

(57)　　　ABSTRACT

A pipe support system includes a pair of leg supports spaced apart from one another. Each of the pair of leg supports includes an elongated base and a column. The pipe support system also includes a strut coupled to each column of the pair of leg supports and at a first height above the elongated bases. A support platform coupled to each column of the pair of leg supports and at a second height above the elongated bases. The support platform defines a longitudinal axis, and the second height is different from the first height. The pipe support system further includes one or more rollers coupled to the support platform. The one or more rollers are disposed around the support platform and rotatable around the longitudinal axis.

6 Claims, 8 Drawing Sheets

(56)                  References Cited

U.S. PATENT DOCUMENTS

| | | | |
|---|---|---|---|
| 2,461,394 A | 2/1949 | Plante | |
| 2,480,412 A | 8/1949 | Hubert | |
| 2,606,952 A | 8/1952 | Cofer | |
| 3,016,219 A | 1/1962 | Murphy | |
| 3,398,933 A | 8/1968 | Haroldson | |
| 3,554,475 A * | 1/1971 | Benno | F16C 13/04 |
| | | | 384/205 |
| 3,687,406 A | 8/1972 | Krahe | |
| 3,769,190 A | 10/1973 | Deem, Jr. | |
| 3,809,348 A | 5/1974 | Di Laura | |
| 3,861,046 A * | 1/1975 | Arn | E04G 21/1833 |
| | | | 33/405 |
| 4,386,870 A | 6/1983 | Baroody | |
| 4,445,656 A | 5/1984 | Leitch | |
| 4,502,653 A | 3/1985 | Curtis, Jr. | |
| 5,110,073 A | 5/1992 | Schoenky | |
| 5,163,642 A * | 11/1992 | Torrens | F16B 2/065 |
| | | | 248/55 |
| 5,358,209 A | 10/1994 | Ward | |
| 5,435,411 A | 7/1995 | Borgatti | |
| 5,437,424 A | 8/1995 | Netz, Sr. | |
| 5,718,344 A | 2/1998 | Joldeson | |
| 5,768,830 A * | 6/1998 | Kelly | F16M 11/24 |
| | | | 52/127.2 |
| 5,785,457 A | 7/1998 | Thompson | |
| 5,906,341 A | 5/1999 | Brown | |
| 6,206,613 B1 | 3/2001 | Elkins | |
| 6,227,752 B1 | 5/2001 | Friedrich | |
| 6,332,595 B1 * | 12/2001 | Klucznik | F16L 3/18 |
| | | | 248/80 |
| 6,364,256 B1 | 4/2002 | Neider | |
| 6,405,981 B1 | 6/2002 | Hung-Jang | |
| 6,592,093 B2 | 7/2003 | Valentz | |
| 6,964,126 B1 * | 11/2005 | Anderson | A01G 17/04 |
| | | | 47/45 |
| 6,988,704 B2 | 1/2006 | Sievers | |
| 7,000,787 B2 * | 2/2006 | Felsenthal | A47F 5/137 |
| | | | 211/175 |
| 7,527,227 B1 | 5/2009 | Mondello | |
| 7,621,486 B1 | 11/2009 | Barrepski | |
| 7,673,917 B2 | 3/2010 | Oliason | |
| 8,033,024 B2 | 10/2011 | Goop | |
| 8,052,098 B1 | 11/2011 | Kowaleski | |
| 8,052,110 B2 | 11/2011 | Wang | |
| 8,348,317 B1 | 1/2013 | Bird | |
| 9,631,355 B1 | 4/2017 | Taraszkiewicz | |
| 10,077,893 B1 | 9/2018 | Abraham | |
| 10,746,323 B2 | 8/2020 | Ball | |
| 10,774,951 B2 | 9/2020 | Ball | |
| 2001/0009087 A1 | 7/2001 | Valentz | |
| 2002/0011548 A1 | 1/2002 | Parker | |
| 2003/0025059 A1 | 2/2003 | Valentz | |
| 2004/0113025 A1 | 6/2004 | Sargent | |
| 2013/0214101 A1 | 8/2013 | Daniel | |
| 2014/0339375 A1 * | 11/2014 | Birch | F16L 3/18 |
| | | | 248/49 |
| 2015/0048222 A1 | 2/2015 | Eley | |
| 2016/0131280 A1 | 5/2016 | Brown | |
| 2016/0298794 A1 * | 10/2016 | Costa | F16L 3/20 |
| 2019/0145547 A1 | 5/2019 | Ball | |
| 2019/0145548 A1 | 5/2019 | Ball | |
| 2020/0070025 A1 | 3/2020 | Orlando | |
| 2021/0148118 A1 | 5/2021 | Ball | |

OTHER PUBLICATIONS

Eaton, "DURA-BLOK B-Line Series—A Complete Rooftop Support Solution", Jun. 2018, 8 pgs.

Haydon, "H-Block Rooftop Support Systems" Catalog, Jan. 2016, 28 pgs.

MIFAB C-Port, "C-Port Rubber Supports Lisi Price Guide", 2012, 20 pgs.

Miro Industries, Inc., "Rooftop Support Products", www.miroind.com/products/, downloaded Aug. 2019, known as of Oct. 2017, 4 pgs.

OMG Roofing products, "Pipe Supports and Flashings", www.omgroofing.com/pipe-supports.html?language=en, 2016, 1 pg.

PHP Systems/Designs, "Product Spotlight: Equipment & Solar Supports, Duct & Cable Trays" Product Flyer, downloaded Aug. 2019, known as of Oct. 2017, 4 pgs.

Pipe Prop, "Adjustable Rooftop Pipe Support System" Brochure, Oct. 2017, 2 pgs.

PortalsPlus, "Pipe Mountings Pedestals", www.portalsplus.com, Oct. 2017, 1 pg.

Roof Top Blox, "Adjustable Piping Support" Catalog, Sep. 2013, 2 pgs.

* cited by examiner

PIPE SUPPORT SYSTEMS

CROSS-REFERENCE TO RELATED APPLICATIONS

This application is a continuation of U.S. patent application Ser. No. 17/664,257 filed May 20, 2022, which is a continuation of U.S. patent application Ser. No. 16/863,849, filed Apr. 30, 2020, now U.S. Pat. No. 11,378,204 which claims priority to and the benefit of U.S. Provisional Application No. 62/845,035, filed May 8, 2019, the disclosures of which are hereby incorporated by reference herein in their entireties.

INTRODUCTION

Service piping may be installed in horizontal or substantially horizontal orientations along roofs, floors, and other indoor or outdoor surfaces. Such piping may include hot water (or steam) and chilled water piping for heating and cooling applications, respectively. Other service piping may include domestic hot water and cold water, storm drainage, or sewer piping. Additionally, specialty piping such as chemical and/or gas piping for industrial processes may be installed. Typically, all of these types of piping are installed above the surface along which they are routed to maintain required clearances, accommodate thermal expansion and contraction, and to increase visibility thereof to reduce potential damage. In another application, electrical wiring (within or outside of protective conduit) may be installed.

SUMMARY

In an aspect, the technology relates to a pipe support system including: a pair of leg supports spaced apart from one another, wherein each of the pair of leg supports includes an elongated base and a column; a strut coupled to each column of the pair of leg supports and at a first height above the elongated bases; a support platform coupled to each column of the pair of leg supports and at a second height above the elongated bases, wherein the support platform defines a longitudinal axis, and wherein the second height is different from the first height; and one or more rollers coupled to the support platform, wherein the one or more rollers are disposed around the support platform and rotatable around the longitudinal axis.

In an example, the pipe support system further includes one or more disks coupled to the support platform and slidable along the longitudinal axis. In another example, the one or more rollers includes a plurality of rollers and the one or more disks are disposed between two rollers of the plurality of rollers. In yet another example, the support platform is adjustable on the columns so that the second height is changeable. In still another example, the strut is coupled between the columns so that the first height is fixed. In an example, the strut defines the spacing of the pair of leg supports.

In another example, the support platform is disposed on a side of the columns. In yet another example, the elongated base and the column are removably coupled together. In still another example, the strut and the support platform have a substantially similar cross-sectional profile. In an example, the support platform and the one or more rollers are co-axial.

In another aspect, the technology relates to a pipe support system including: a pair of leg supports, wherein each of the pair of leg supports include a tubular column threadingly coupled to an elongate base; a tubular strut threadingly coupled between each tubular column of the pair of leg supports, wherein the tubular strut defines spacing between the pair of leg supports; a tubular support platform slidably coupled to one side of each tubular column of the pair of leg supports, wherein the tubular support platform defines a longitudinal axis; a plurality of cylindrical rollers coupled to the tubular support platform, wherein the plurality of cylindrical rollers are disposed around the tubular support platform and rotatable around the longitudinal axis; and one or more disks coupled to the tubular support platform and disposed between two cylindrical rollers of the plurality of cylindrical rollers.

In an example, the one or more disks are rotatable around the longitudinal axis. In another example, the tubular support platform, the plurality of cylindrical rollers, and the one or more disks are co-axial. In yet another example, the tubular support platform is coupled to each tubular column by a U-bolt. In still another example, the tubular support platform has a larger diameter cross-sectional profile than the tubular strut. In an example, the tubular support platform is disposed above the tubular strut.

In another example, each of the plurality of cylindrical rollers are independently rotatable around the longitudinal axis. In yet another example, both of the tubular columns have a larger diameter cross-sectional profile than the tubular support platform.

In another aspect, the technology relates to a pipe support system including: a pair of leg supports spaced apart from one another, wherein each of the pair of leg supports include a column threadingly coupled to an elongate base; a strut threadingly coupled between each column of the pair of leg supports and at a first height above the elongated bases, wherein the strut defines the spacing between the pair of leg supports; a support platform adjustably coupled to each column of the pair of leg supports and at a second height above the elongated bases, wherein the support platform defines a longitudinal axis, wherein the second height is different from the first height, and wherein both ends of the support platform are adjustably coupled to the columns via a U-bolt; a plurality of rollers co-axially coupled to the support platform, wherein the plurality of rollers are disposed around the support platform and rotatable around the longitudinal axis; and one or more disks coupled to the support platform and disposed between two cylindrical rollers of the plurality of rollers.

In an example, each of the plurality of rollers are independently rotatable around the longitudinal axis and slidable along the longitudinal axis.

BRIEF DESCRIPTION OF THE DRAWINGS

There are shown in the drawings examples that are presently preferred, it being understood, however, that the invention is not limited to the precise arrangements and configurations shown.

DETAILED DESCRIPTION

As noted above, the devices described herein can be used to support various service piping (exposed, insulated, or otherwise encased), conduits, wiring, or other elongate structures. As a nonexclusive example, the specification describes the devices in the context of piping support.

The pipe support systems described herein are configured to be field-assembled and adjustable to support one or more pipe(s) installed above an underlying surface (e.g., a roof surface). The pipe support systems are robust so as to accommodate heavy piping while not tipping over. One or more rollers are rotatable around a support platform to enable the piping to be axially moveable (e.g., due to thermal expansion or installation) so that stress induced on the pipes is decreased. For example, during installation of large heavy piping, the rollers enable the piping to roll across the top of the pipe support systems. This configuration increases installation efficiencies and reduces wear on the piping. Furthermore, the rollers decrease frictional resistance of the pipe support system so that as the pipe(s) are pushed across the top, the pipe support system does not tip over. In contrast, at least some known support systems for large, heavy piping employ a static support, thereby being prone to tip over during pipe installation. The pipe support system also includes components that reduce or eliminate the amount of sharp corners and edges so as to reduce wear on the pipes that are supported.

Figure 1:
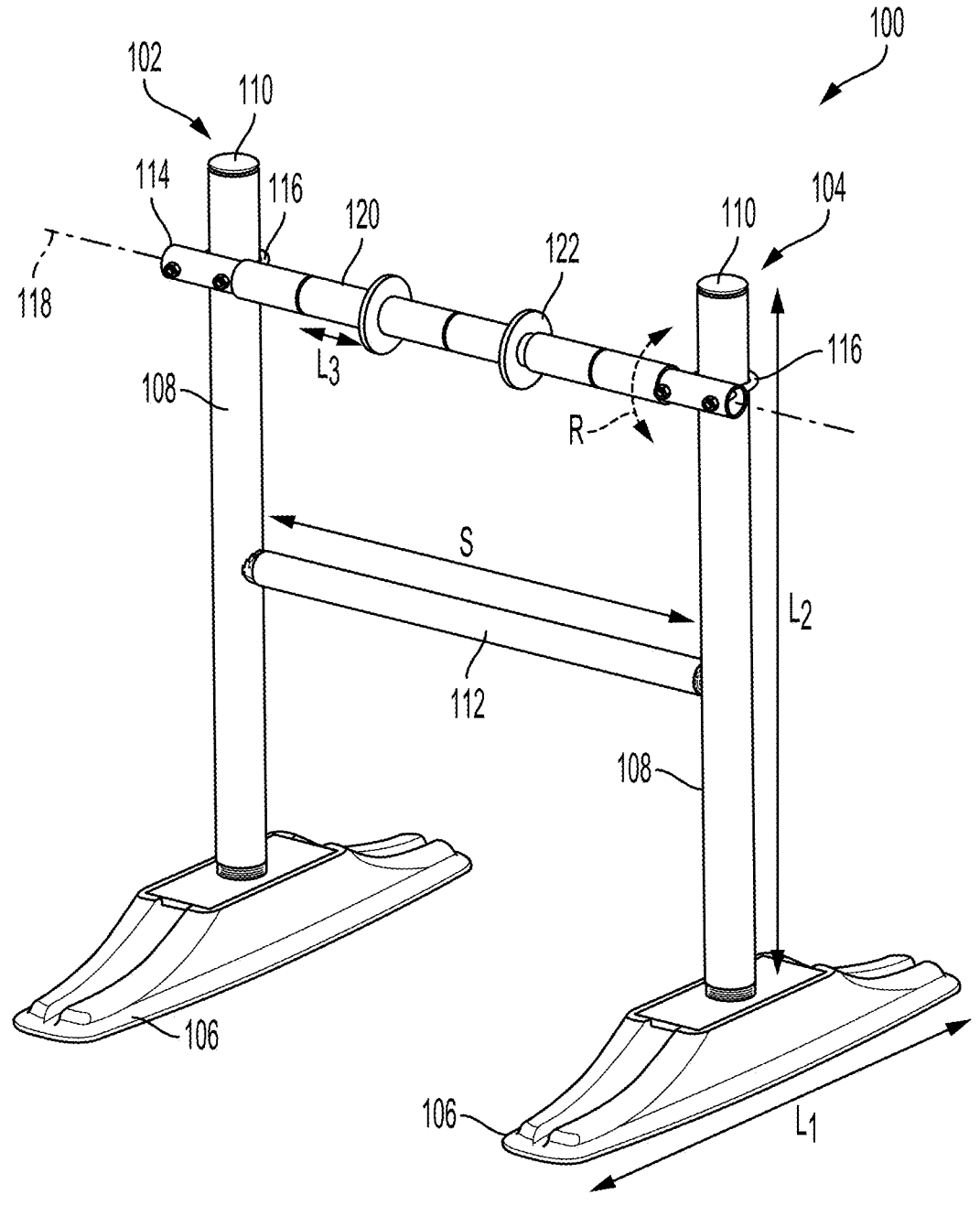
FIG. 1 is a perspective view of an exemplary pipe support system.

FIG. 1 is a perspective view of an exemplary pipe support system 100. In the example, the pipe support system 100 includes a pair of leg supports (e.g., left leg support 102 and right leg support 104) that are spaced S apart from one another. Each leg support 102, 104 includes an elongated base 106 that is configured to be placed on an underlying surface and provide stability for the pipe support system 100 when placed on the underlying surface. The elongated base 106 has a first length $L_1$ that extends in a direction that is substantially orthogonal to the direction of the spacing S between each leg support 102, 104. Additionally, each leg support 102, 104 includes a column 108 that is removably coupled to the base 106 and extends in an upward direction. The column 108 has a second length $L_2$ that extends in a direction that is substantially orthogonal to both the elongated base direction and the spacing S direction between the leg supports 102, 104.

In the example, the length $L_2$ of the column 108 is greater than the length $L_1$ of the base 106. In an aspect, the length $L_2$ of the column 108 is 5-20% greater than the length $L_1$ of the base 106. The ratio of the column 108 and base 106 lengths increases the load capacity of the pipe support system 100 and decreases the pipe support system 100 tipping over in use. As described herein, tipping over of the pipe support system 100 can be in the forward and backward direction (e.g., along the extension direction of the elongated base 106) or in a left and right side direction (e.g., along the extension direction of the strut 112 and the support platform 114).

As illustrated in FIG. 1, the column 108 is substantially tubular with a circular cross-sectional profile and is threadingly coupled to the base 106. Opposite of the base 106, the column 108 can have an end cap 110. By enabling the column 108 and base 106 to be easily coupled together (e.g., via a threaded connection), the pipe support system 100 can be assembled on-site, and shipping of the pipe support system 100 is more efficient.

A strut 112 is coupled to and extends between each column 108 above the base 106. The strut 112 at least partially defines the space S between each leg support 102, 104. The strut 112 also provides structural support to the pipe support system 100 to prevent it from tipping over. In some examples, the strut 112 may also be used to support piping and/or conduit as required or desired and can be considered load bearing. In the example, the strut 112 is substantially tubular with a circular cross-sectional profile and is threadingly coupled to each column 108. As such, the strut 112 is also easily assembled on-site.

A support platform 114 also is coupled to and extends between each column 108 above the base 106 and configured to support a load (e.g., one or more pipes). The support platform 114 is slidingly coupled to each column 108 by a U-bolt 116 at each end of the support platform 114. The support platform 114 defines a longitudinal axis 118 that is substantially parallel to the direction of the spacing S between each leg support 102, 104. In the example, the support platform 114 is substantially tubular with a circular cross-sectional profile, and its position along the columns 108 can be adjusted (e.g., via the U-bolts 116) as required or desired. As such, the support platform 114 is also easily assembled and adjusted on-site. It should be appreciated that while U-bolts 116 are illustrated herein, the connectors can be of any type that enable height adjustment of the support platform 114 as described herein. Additionally or alternatively, the support platform 114 can be assembled onto the pipe support system 100 after the strut 112, and, as such, when both the strut 112 and the support platform 114 are utilized to support loads, the strut 112 can be loaded first prior to the support platform 114 being coupled to the leg supports 102, 104.

In the example, both the strut 112 and the support platform 114 are substantially tubular and have a substantially circular cross-section. In an aspect, both the strut 112 and the support platform 114 may have a substantially similar cross-sectional profile and outer diameter. In another aspect, the strut 112 and the support platform 114 may have different cross-sectional profiles and outer diameter as required or desired. For example, the support platform 114 can have a larger cross-sectional profile and outer diameter than the strut 112 so that the support platform 114 can support a heavier load. In the example, by forming the strut 112 and the support platform 114 as tubular members, the pipe(s) that are supported thereon are supported by a reduced surface area, when compared to a substantially flat surface, and thus can more easily slide across the components and reduce wear on the pipe(s) and tip over of the pipe support system 100.

In examples, at least one or, as illustrated in FIG. 1, a plurality of rollers 120 are coupled to the support platform 114 and positioned between the two columns 108. In the example, the rollers 120 are substantially cylindrical in shape and are disposed around the support platform 114. The rollers 120 and are freely rotatable R about the support platform 114 and around the longitudinal axis 118, and also slidable relative to the support platform 114 along the longitudinal axis 118. As such, the rollers 120 and the support platform 114 are co-axial relative to the longitudinal axis 118 and the rollers 120 are radially larger than the support platform 114. The rollers 120 enable the pipe supported on the support platform 114 to be axially moveable (e.g., due to thermal expansion or during installation) so that stress induced on the pipe from the pipe support system 100 is decreased. Additionally, the rollers 120 enable heavy pipes to be pushed across the pipe support system 100 without tipping over.

The rollers 120 may be formed in a predefined length $L_3$ (e.g., six independent and separate rollers 120 that fit on the support platform 114) or may be selectively cut to length in the field so that two or more rollers 120 can have different lengths as required or desired. In the example, each of the rollers 120 are independently rotatable R around the longitudinal axis 118. By using a plurality of rollers 120, multiple pipes can be supported on the support platform 114 and can be independently moveable.

Additionally, in some examples, one or more disks 122 are coupled to the support platform 114. The disks 122 extend radially from the support platform 114 and the longitudinal axis 118 so as to reduce or prevent the pipes supported on the support platform 114 from laterally moving along the longitudinal axis 118. The disks 122 may be positioned between two rollers 120 as illustrated in FIG. 1. In other examples, the disks 122 may be positioned at the ends of the roller 120 and adjacent to the columns 108 so as to reduce lateral movement and/or prevent the pipes supported on the support platform 114 from contacting the columns 108. The disks 122 are co-axial with both the rollers 120 and the support platform 114 along the longitudinal axis 118. In some examples, the disks 122 may also rotate relative to the support platform 114 and around the longitudinal axis 118. Additionally, the disks 122 are also slidable along the longitudinal axis 118 relative to the support platform 114. In other examples, the disks 122 may fit over the rollers 120 instead of being disposed between rollers as required or desired. In this example, the disks 122 can be integral with the rollers 120. In an aspect, the pipe support system 100 can support a plurality of different sized pipes and space them apart from one another.

As illustrated in FIG. 1, the rollers 120 and the disks 122 are shown coupled to the support platform 114. Additionally or alternatively, the rollers 120, the disks 122, or the rollers 120 and the disks 122 may be coupled to the strut 112 and rotatable and slidable thereon. In this configuration, when pipes are supported on the strut 112, the pipes can be axially moveable and separated so as to increase performance of the pipe support system 100.

Figure 2:
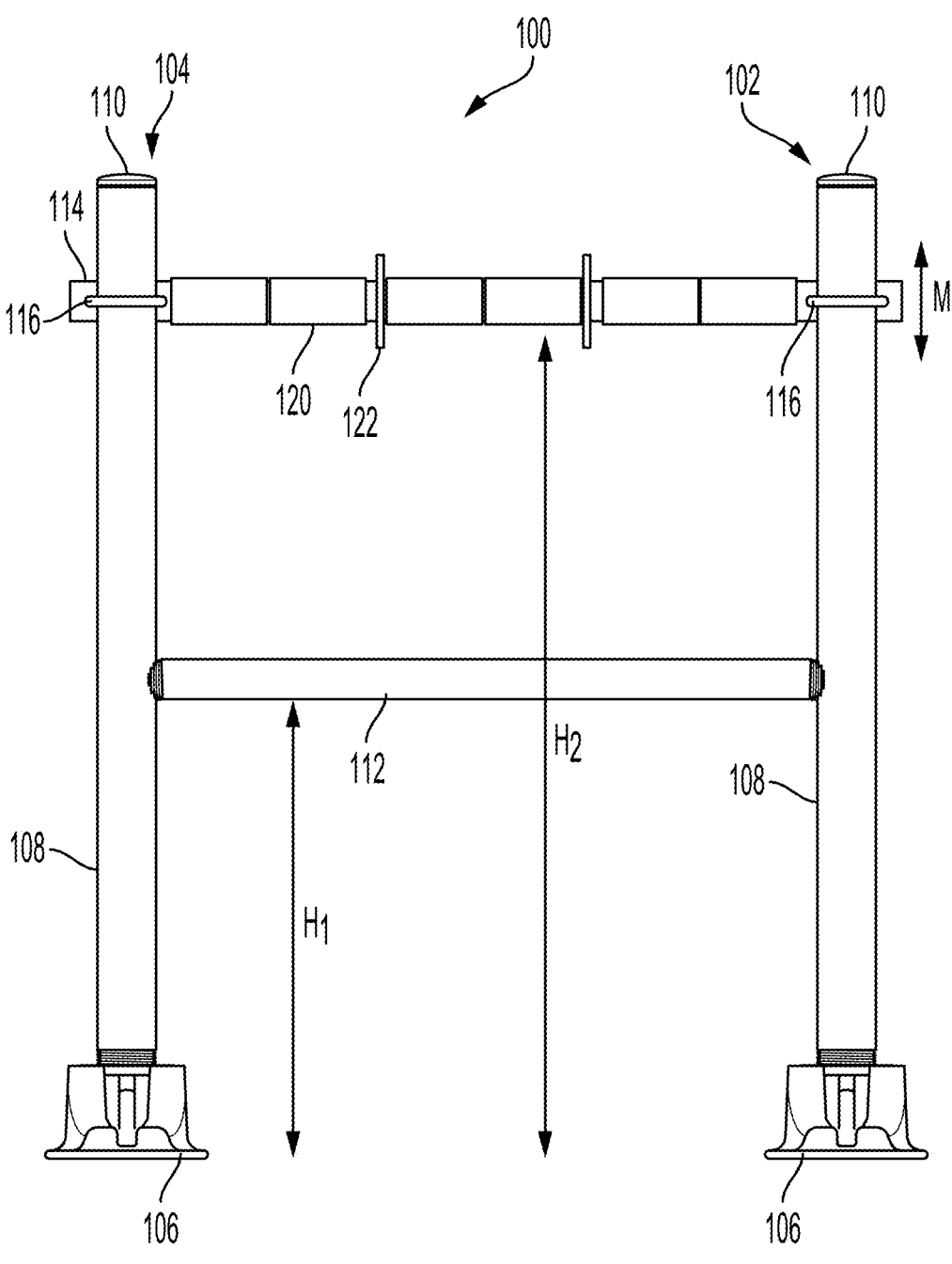
FIG. 2 is a side view of the pipe support system.

FIG. 2 is a side view of the pipe support system 100. Certain components are described above, and thus, are not necessarily described further. In the example, the strut 112 is coupled to each column 108 at a first height H1 above the elongated bases 106. Because the strut 112 is threadingly coupled to the columns 108, the first height $H_1$ is fixed on the pipe support system 100. The support platform 114 is adjustably coupled to each column 108 at a second height $H_2$ above the elongated bases 106. Because U-bolts 116 are used to couple the support platform 114 to the columns 108, the second height $H_2$ of the support platform 114 is adjustable on the pipe support system 100 and the entire support platform 114 can move M relative to the columns 108. By allowing adjustability of the support platform 114, the height of the piping supported on the pipe support system 100 and above the underlying surface can be selected as required or desired.

In the example, the second height $H_2$ may be greater than the first height $H_1$ so that the support platform 114 is disposed above the strut 112. In other examples, the second height $H_2$ may be less than the first height $H_1$ so that the support platform 114 is disposed below the strut 112. Each end of the support platform 114 is coupled to the columns 108 by the U-bolt 116 so that the second height $H_2$ may be easily adjusted on-site as required or desired. By having the first height $H_1$ of the strut 112 different than the second height $H_2$ of the support platform 114, both the strut 112 and the support platform 114 can be used a load bearing supports for the piping attached thereto.

Also illustrated in FIG. 2, a diameter of the disks 122 are larger than both the rollers 120 and the support platform 114 so that the pipes supported on the pipe support system 100 can be separated and spaced along the longitudinal axis 118 (shown in FIG. 1).

Figure 3:
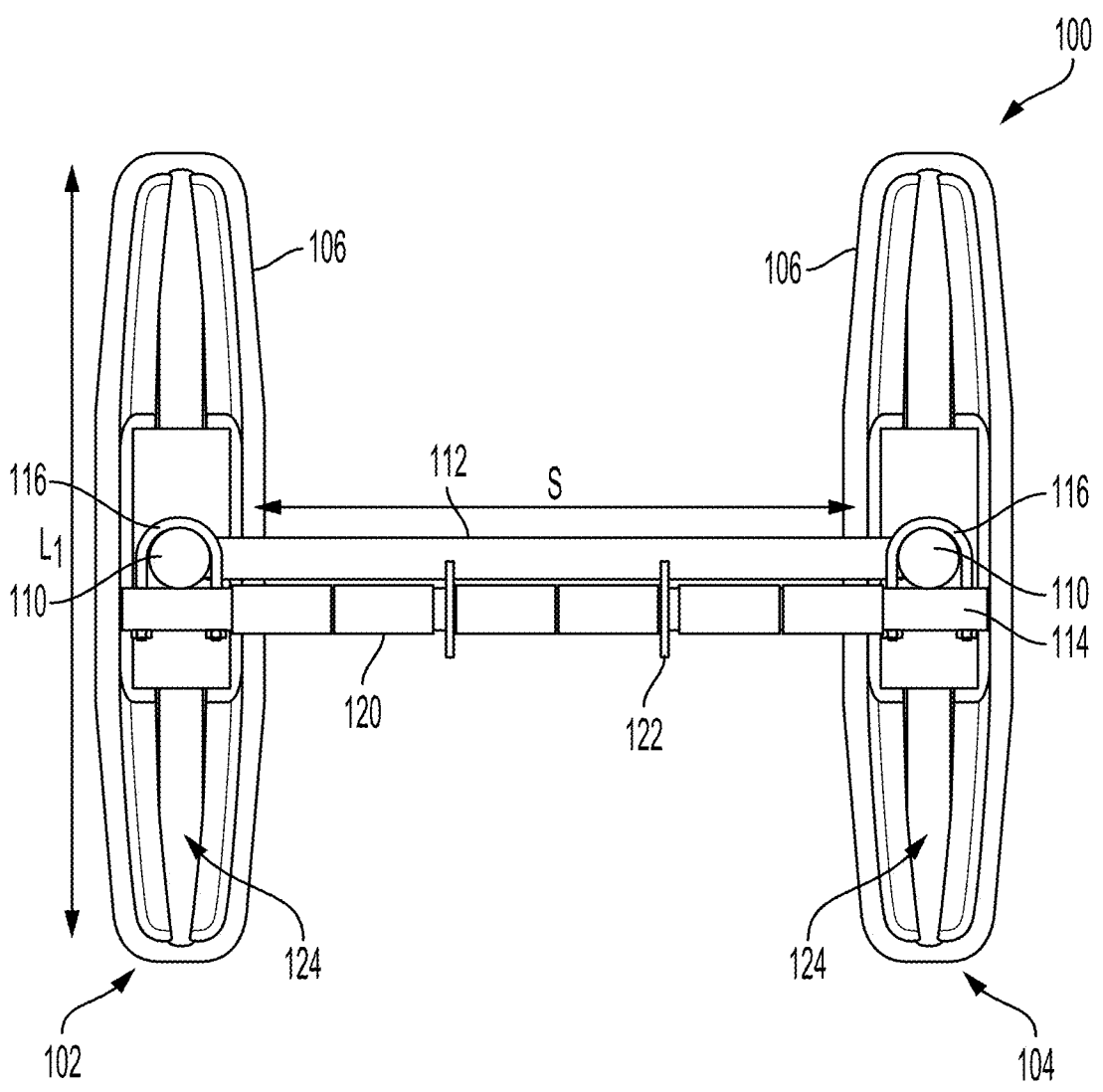
FIG. 3 is a top view of the pipe support system.

FIG. 3 is a top view of the pipe support system 100. Certain components are described above, and thus, are not necessarily described further. In the example, the support platform 114 is positioned on one side of the columns 108 (shown in FIG. 2) and the strut 112, and offset from both. As such, the columns 108 and the strut 112 are aligned on the same reference plane. This configuration increases the space S between the columns 108 for the pipes to be supported on the support platform 114 without interference from the U-bolts 116. Additionally, this configuration allows U-bolts 116 to be used so that the height of the support platform 114 can be adjustable as required or desired. In other examples, the support platform 114 may be positioned directly between the two columns 108 and aligned with the strut 112 as required or desired.

In the example, each elongated base 106 includes a channel 124 formed in the top of the base 106. The channel 124 can allow for a mounting bolt (not shown) to be used to secure the base 106 to the underlying surface. For example, an anchor bolt can disposed within the channel 124 and into the surface (e.g., roof deck). In other examples, an adhesive layer (not shown) may be used to secure the base 106 to the underlying surface as required or desired. It is appreciated, however, that the structural shape of the pipe support system 100 enables the system to be used without requiring any extra tie down features with the underlying surface. For example, the length $L_1$ of the elongated base 106 is greater than or equal to the length of the spacing S between the leg supports 102, 104. In an aspect, the length $L_1$ of the base 106 is about 5-10% greater than the length of the spacing S. The ratio of the base 106 and spacing S lengths increases the load capacity of the pipe support system 100 and decreases the pipe support system 100 tipping over in use.

Also illustrated in FIG. 3, the cross-sectional profile of the columns 108 have a larger diameter than the strut 112. This enables the strut 112 to thread into the columns 108 when the pipe support system 100 is assembled. Additionally, the cross-sectional profile of the columns 108 have a larger diameter than the support platform 114. By increasing the cross-sectional profile of the columns 108, the load that the pipe support system 100 can support is increased.

Figure 4:
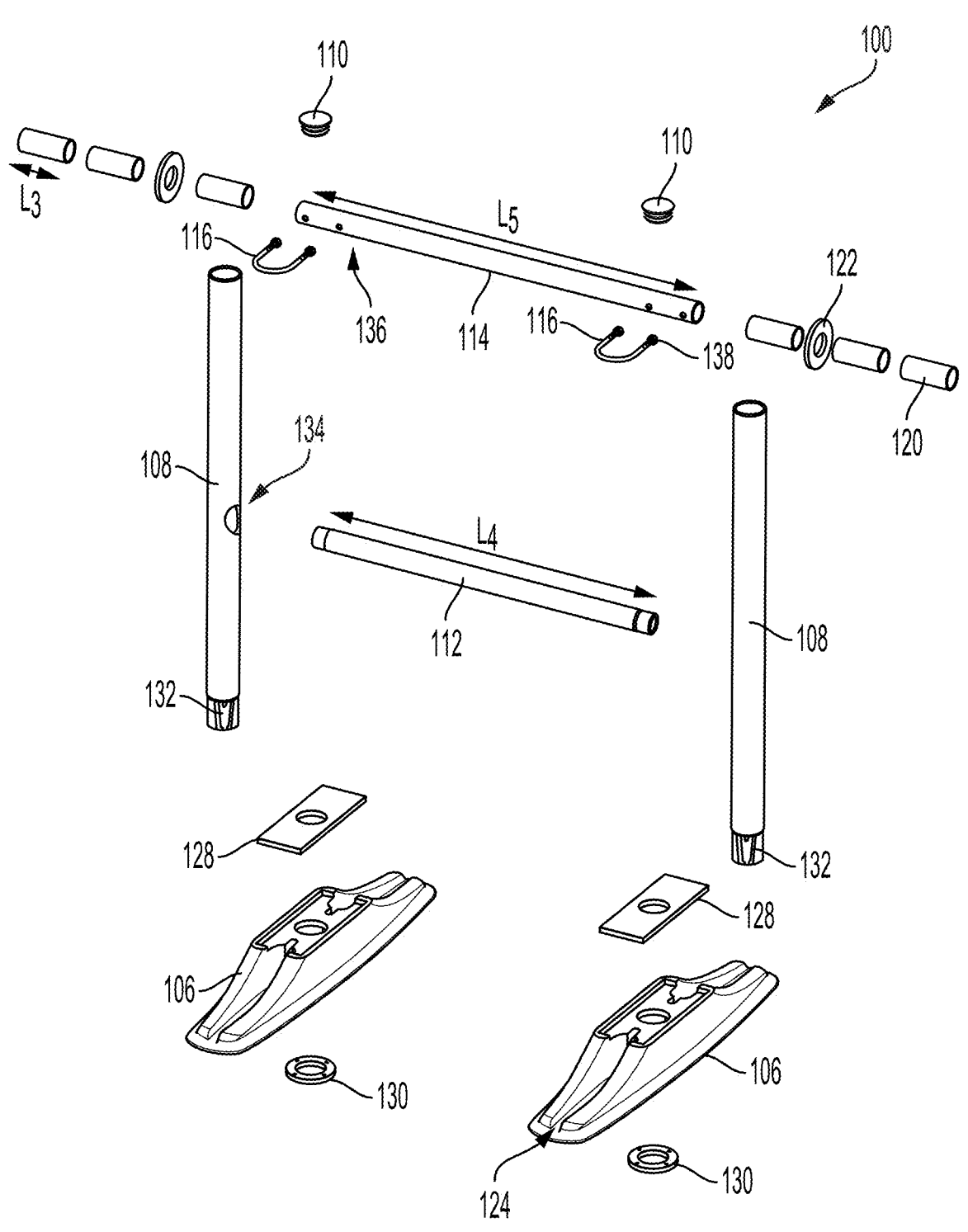
FIG. 4 is an exploded perspective view of the pipe support system shown in FIGS. 1-3.

FIG. 4 is an exploded perspective view of the pipe support system 100 shown in FIGS. 1-3. In the example, the elongated base 106 is a molded component with a top end that has channels 124 and a raised platform 126. In an aspect, the elongated base 106 can be formed from a plastic-based material. The raised platform 126 is sized and shaped to support a base plate 128 that increases the strength of the column 108 and base 106 connection. The elongated base 106 also forms an interior cavity that can receive a threaded nut 130 that is used to secure the column 108 to the base 106. The column 108 has one end 132 that is threaded and an opposite end that receives the end cap 110. The threaded end 132 of the column 108 is connected to the elongated base

106 by the base plate 128 and the threaded nut 130. In some examples, the base plate 128 has an aperture that can be threaded so that the column 108 threadingly engages with components positioned both above and below the elongated base 106.

Between the ends of the column 108, a threaded hole 134 is defined in the column 108 that is size and shaped to receive a threaded end of the strut 112. The strut 112 is coupled to each column 108 by threading engaging with the holes 134. In an aspect, the hole 134 is located at approximately the midpoint of the length $L_2$ of the column 108 (shown in FIG. 1). The support platform 114 is adjustably coupled to each column 108 by the U-bolt 116 at each end. The U-bolt 116 is sized and shaped to extend around the column 108 and through corresponding apertures 136 at each end of the support platform 114. The U-bolt 116 is then secured by a pair of nuts 138 to frictionally secure the support platform 114 to the column 108. This configuration enables for the height of the support platform 114 to be adjusted as required or desired.

In the example, a length $L_4$ of the strut 112 is less than a length $L_5$ of the support platform 114. This configuration enables the strut 112 to be coupled between and in the same reference plane of the columns 108, and the support platform 114 to be disposed on one side of the columns 108 while allowing space for the U-bolt 116 connectors. In other examples, however, both the strut 112 and the support platform 114 may have the same length and be similarly coupled to the columns 108 as required or desired. For example, both the strut 112 and the support platform 114 may be threadingly coupled to the columns 108 and within the same reference plane, or both the strut 112 and the support platform 114 may be adjustably coupled to the columns 108 via the U-bolts 116. As such, both the support platform 114 and the strut 112 can be fixed or can be adjustable, relative to the columns 108, as required or desired. In still other examples, the support platform 114 can be fixed on the columns 108 (e.g., via a threaded connection), while the strut 112 is adjustable on the columns 108 (e.g., via a U-bolt).

In the example, the length $L_5$ of the support platform 114 is greater than or equal to the length $L_2$ of the column 108. In an aspect, the length $L_5$ of the support platform 114 is approximately equal to the length $L_2$ of the column 108. The ratio of the support platform 114 and the column 108 lengths increases the load capacity of the pipe support system 100 and decreases the pipe support system 100 tipping over in use.

A plurality of rollers 120 and disks 122 are coupled to the support platform 114. In the example, the rollers 120, the disks 122, and the support platform 114 are all co-axial and the rollers 120 and disks 122 can both slide and rotate relative to the support platform 114. Both of the rollers 120 and the disks 122 can be selectively positioned on the support platform 114 to accommodate the pipe(s) supported thereon. In an aspect, the lengths $L_3$ of the rollers 120 can be at least partially based on the size of the supported pipes because the rollers 120 enable the pipe supported on the support platform 114 to be axially moveable (e.g., due to thermal expansion or during installation) so that stress induced on the pipe from the pipe support system 100 is decreased. For example, smaller diameter pipes may reduce the length $L_3$ of the rollers 120 that support the pipes, while larger diameter pipes may increase the length $L_3$ of the rollers 120.

Multiple pipes can be supported on the support platform 114, and as such, the rollers 120 are independently rotatable.

The disks 122 can be selectively positioned relative to the rollers 120 so as to reduce or prevent the pipes from moving along the support platform 114. The disks 122 can also be positioned to reduce or prevent the pipes from contacting the columns 108 as required or desired. It should be appreciated that any combination of rollers 120 and disks 122 spacing and positioning may be utilized as required or desired.

Figure 5:
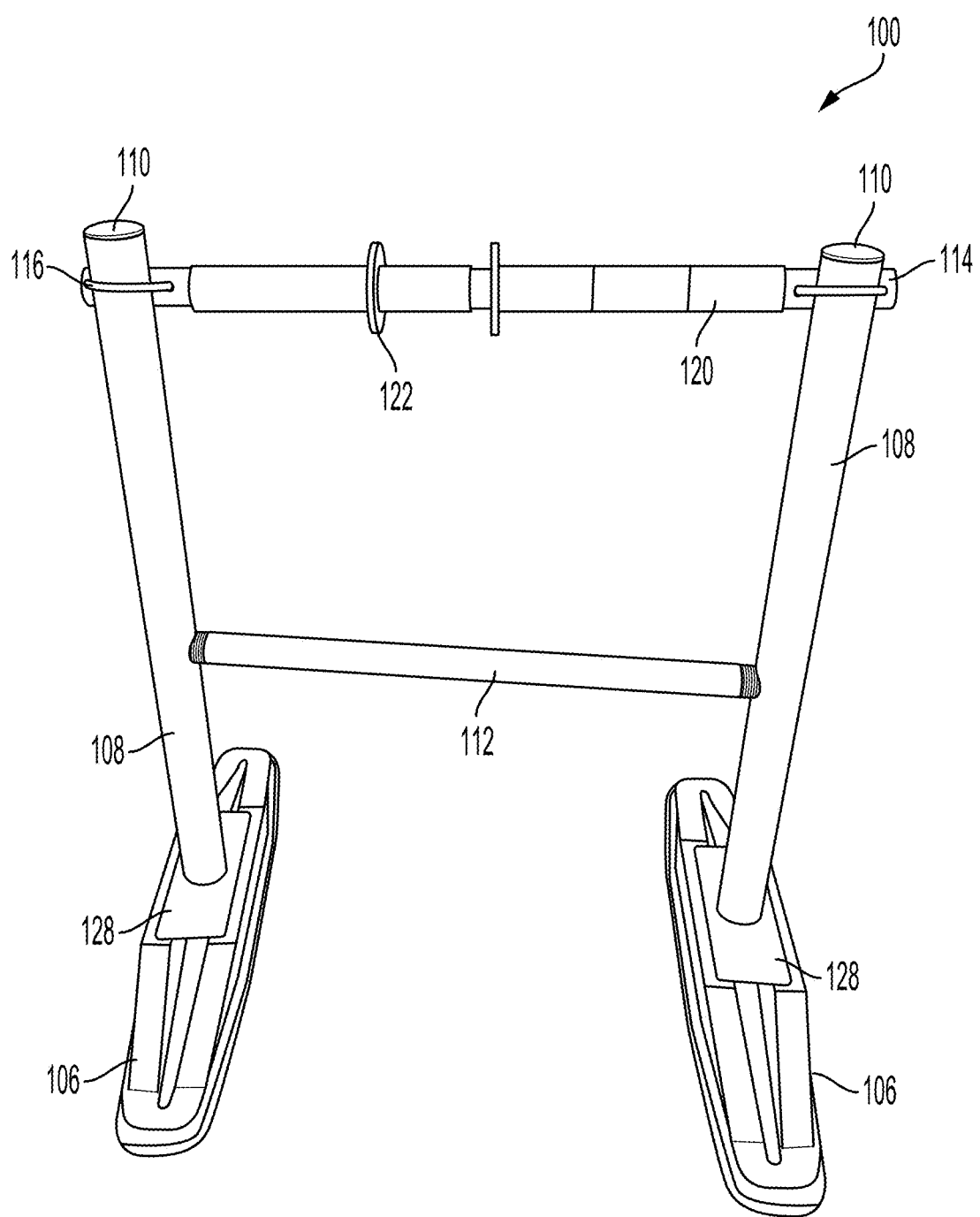
FIG. 5 is an additional perspective view of the pipe support system shown in FIGS. 1-4.

FIG. 5 is an additional perspective view of the pipe support system 100. Certain components are described above, and thus, are not necessarily described further. As described above, any combination of rollers 120 and disks 122 and the spacing and positioning thereof may be used on the support platform 114. As illustrated in FIG. 5, two rollers 120 are disposed on one side of the support platform 114, a single roller 120 is disposed between two disks 122 in the middle, and three rollers 120 are disposed on the other side of the support platform 114. The rollers 120 and disks 122 are easily coupled to the support platform 114 so that the configuration can be changed on-site as required or desired. As such, assembly of the pipe support system 100 is quick and field configurable for any shape and size of pipe.

In the example, the columns 108, base plates 128, strut 112, support platform 114, and U-bolts 116 can be formed from a steel or aluminum based material. This provides material strength for the pipe support system 100 to support the pipes placed thereon. Additionally, the pipe support system 100 can be used in any type of environmental conditions. The elongated base 106, rollers 120, and disks 122 can be formed from a plastic based material. This enables complex shapes to be formed and for the movement of the components as described herein so as to increase performance of the pipe support system 100. Additionally, the material of the rollers 120 and the disks 122 decrease frictional resistance when moving relative to the support platform 114 so that as the supported pipe(s) move, the pipe support system 100 does not tip over. It should be appreciated that the material utilized in the pipe support system 100 described herein can be any of those typically utilized for building component manufacture and the specific materials described above are only exemplary and are not to be considered as limiting.

As illustrated herein, the strut 112 and the support platform 114 are tubes with circular profiles. It should be appreciated, however, that other profile shapes and sized can be used that enable the pipe support system 100 to function as described herein. For example, oval cross-sectional profiles, rectangular cross-sectional profiles, etc. In these examples, the rollers 120 can still be used and coupled around the profile, while being rotatable thereto. The U-bolts 116 can be used with these profiles as well. In other examples, the support platform 114 and the strut 112 can have different cross-sectional profiles as required or desired.

Figures 6, 7:
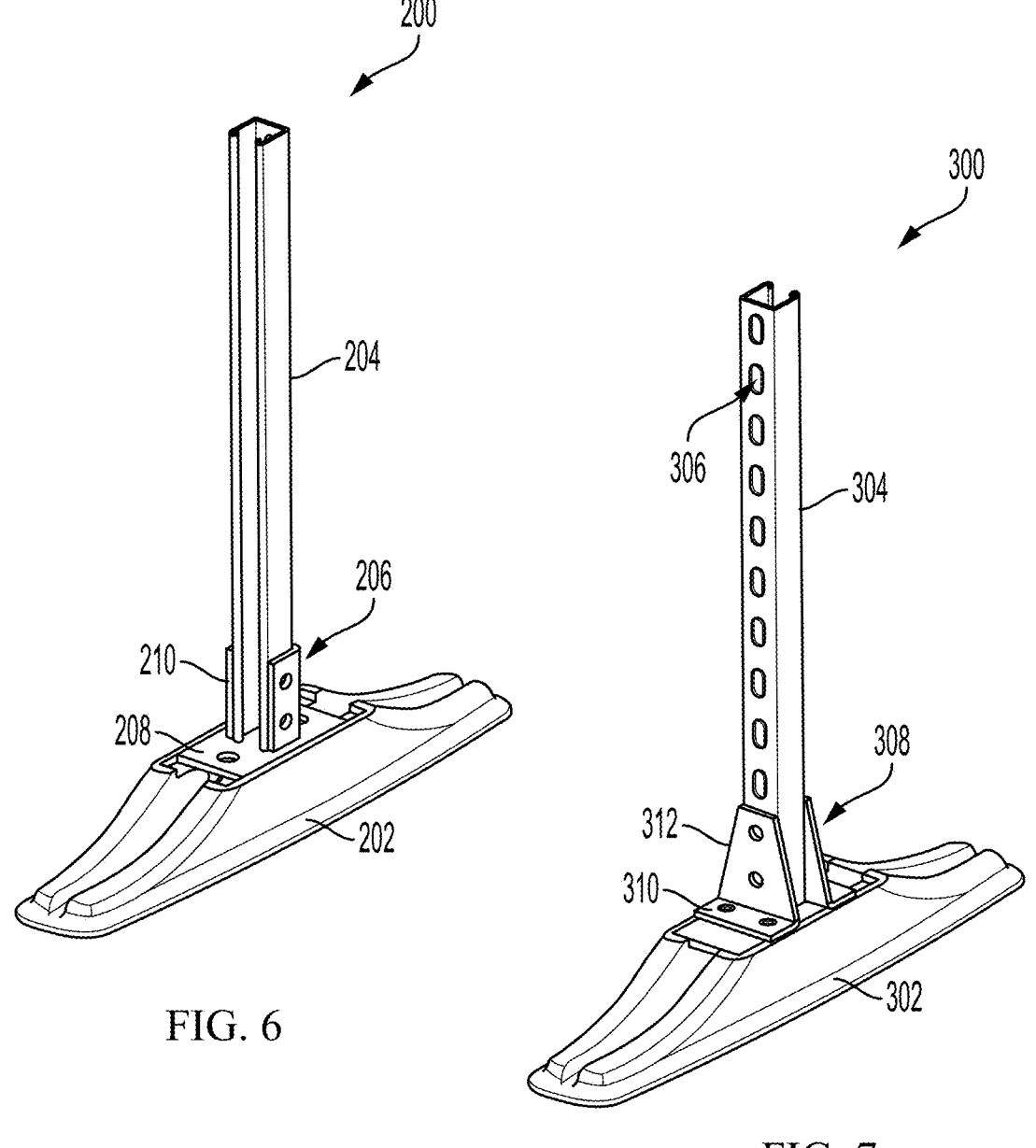
FIG. 6 is a perspective view of a leg support.
FIG. 7 is a perspective view of another leg support.

FIG. 6 is a perspective view of a leg support 200 that can be used with the pipe support systems described herein. In this example, the leg support 200 includes an elongated base 202 removably coupled to a column 204. The column 204 is substantially U-shaped in cross section and has a plurality of holes (not shown) defined on one side. The holes can be used to selectively position a height of the strut and/or the support platform (both not shown). For example, the shape of column 204 and the holes may accommodate connection members (not shown) so as to couple the strut and/or support platform to the column 204 and enable the pipe support system to function as described herein.

In this example, the base 202 and the column 204 are coupled together by a bracket 206. The bracket 206 has a base plate 208 that secures to the elongated base 202 and a post 210 that receives and supports the column 204 (e.g., via bolts (not shown)). In an aspect, the post 210 can substantially match the shape of the column 204, but larger, so that the column 204 can slide therein. The bracket 206 enables the leg support 200 to be easily assembled on-site and increase shipping efficiencies.

FIG. 7 is a perspective view of another leg support 300 that can be used with the pipe support systems described herein. In this example, the leg support 300 includes an elongated base 302 removably coupled to a column 304. The column 304 is substantially U-shaped in cross section and has a plurality of holes 306 defined on one side. The holes 306 can be used to selectively position a height of the strut and/or the support platform (both not shown). For example, the shape of column 304 and the holes 306 may accommodate connection members (not shown) so as to couple the strut and/or support platform to the column 304 and enable the pipe support system to function as described herein.

In this example, the base 302 and the column 304 are coupled together by a bracket 308. The bracket 308 has a base plate 310 that secures to the elongated base 302 and a pair of substantially trapezoidal-shaped posts 312 that receive and support the column 304 (e.g., via bolts (not shown)). The bracket 308 enables the leg support 300 to be easily assembled on-site and increase shipping efficiencies.

Figures 8, 9:
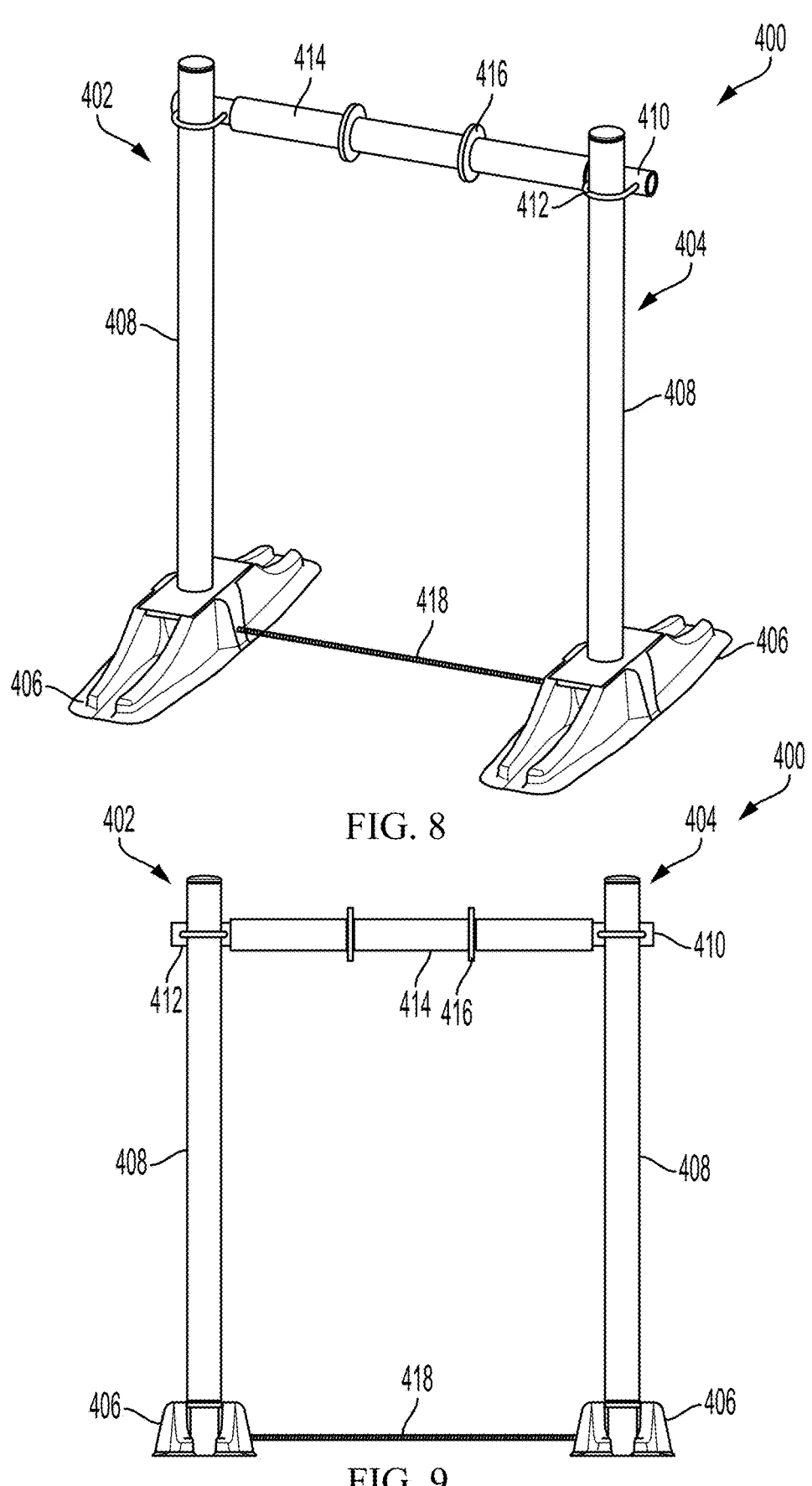
FIG. 8 is a perspective view of another pipe support system.
FIG. 9 is a side view of the pipe support system shown in FIG. 8.

FIG. 8 is a perspective view of another pipe support system 400. FIG. 9 is a side view of the pipe support system 400. Referring concurrently to FIGS. 8 and 9, the pipe support system 400 is similar to the systems described above and includes a pair of space apart leg supports (e.g., left leg support 402 and right leg support 404), each having an elongated base 406 and a column 408. A support platform 410 extends between the columns 408 and secured with U-bolts 412 so that the support platform 410 can be adjustable in height relative to the elongated bases 406. The support platform 410 is configured to support one or more pipes as described herein. Additionally, the support platform 410 can include one or more rollers 414 and/or disks 416 positioned between the columns 408.

In this example, a strut 418 is coupled to and extends between each base 406. The strut 418 provides structural support to the pipe support system 400 to prevent it from tipping over and ties the bases 406 together to keep them from spreading apart. In the example, the strut 418 is an all-threaded rod that threadingly engages a side of each base 406 at each end. In other examples, the strut 418 can be substantially tubular with a circular cross-sectional profile and threaded ends. As such, the strut 418 is also easily assembled on-site. By coupling the bases 406 together with the strut 418, the columns 408 remain component free so that the support platform 410 is adjustable in height along the entire length of the column 408. In some examples, two or more support platforms 410 may be used and slidingly couple to the columns 408. In other examples, two or more struts 418 can be used, for example, one the ties the bases 406 together and one that ties the columns 408 together.

Furthermore, in this example, by using a threaded rod as the strut 418, the spacing between the leg supports 402, 404 can be adjustable as required or desired. So that the support platform 410 can accommodate variable spacing, the ends of the support platform 410 can include two or more sets of apertures so that the U-bolts 412 can be attached to different locations on the support platform 410.

Figures 10, 11A, 11B:
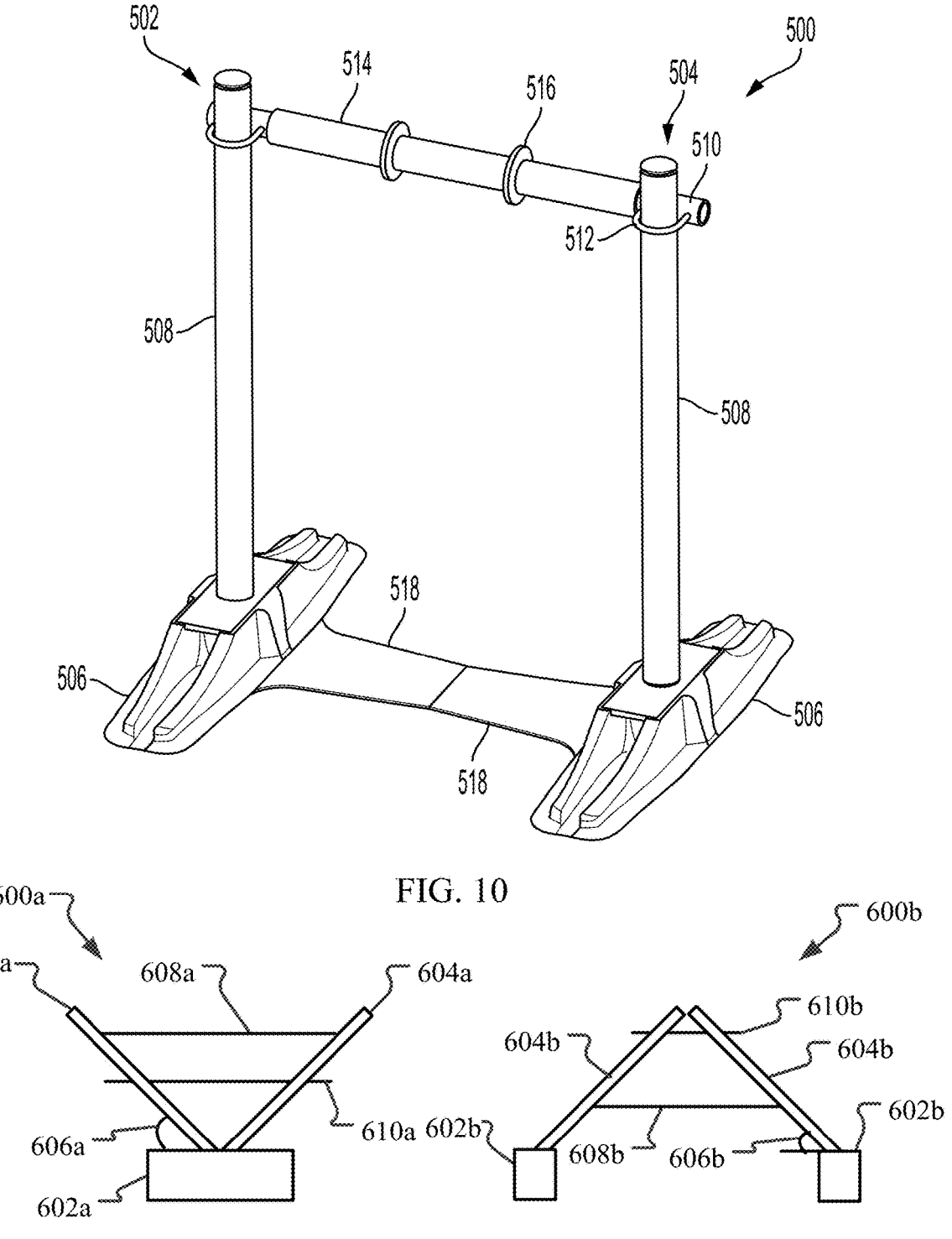
FIG. 10 is a perspective view of another pipe support system.
FIGS. 11A and 11B are schematic views of other pipe support systems.

FIG. 10 is a perspective view of another pipe support system 500. The pipe support system 500 is similar to the systems described above and includes a pair of space apart leg supports (e.g., left leg support 502 and right leg support 504), each having an elongated base 506 and a column 508. A support platform 510 extends between the columns 508 and secured with U-bolts 512 so that the support platform 510 can be adjustable in height relative to the elongated bases 506. The support platform 510 is configured to support one or more pipes as described herein. Additionally, the support platform 510 can include one or more rollers 514 and/or disks 516 positioned between the columns 508.

In this example, each base 506 includes an extension 518. The extensions 518 can be coupled together to provide a structural support strut for the pipe support system 500 to prevent it from tipping over and tie the bases 506 together to keep them from spreading apart. As such, the base 506 defines the spacing between the columns 508 for the pipe support system 500. In the example, the ends of the extensions 518 may be coupled together so as to be easily assembly on-site. These couplings can include, snap-fit, tongue-and-groove, screws, bolts, and the like. These couplings may also enable for the spacing between the columns 508 to be adjustable as required or desired (e.g., via more or less extension 518 overlap). In other examples, the two elongated bases 506 may be coupled together by a unitary extension 518 so that the base 506 is a single unitary component piece. In some examples, two or more support platforms 510 may be used and slidingly couple to the columns 508.

FIG. 11 are schematic views of other pipe support systems 600a and 600b. The pipe support systems 600a and 600b are similar to the systems described above and provide load bearing support for pipes or other components placed therein, while reducing over tipping and facilitating easy on-site assembly. The pipe support system 600a includes a single base 602a and two columns 604a coupled to the base 602a. The columns 604a are disposed with an outside angle 606a so that the columns 604a are substantially V-shaped. In an aspect, the angle 606a is less than 90°. In another aspect, the angles 606a for each column 604a may be different or adjustable, as required or desired. Extending between the columns 604a is a support platform 608a and a strut 610a, the functions of which are described above. The height of the support platform 608a and/or the strut 610a can be adjustable. As such, the coupling connection with the columns 604a enable for the support platform 608a and/or the strut 610a to be adjustable as required or desired. By forming the columns 604a in a V-shape, the space available on the support platform 608a for supporting pipes or other components is increased, while reducing the overall foot print of the pipe support system 600a.

The pipe support system 600b includes two bases 602b and two columns 604b. The columns 604b are disposed with an inside angle 606b so that the columns 604b are substantially A-shaped. In an aspect, the angle 606b is less than 90°. In another aspect, the angles 606b for each column 604b may be different or adjustable, as required or desired. Extending between the columns 604b is a support platform 608b and a strut 610b, the functions of which are described above. The height of the support platform 608b and/or the strut 610b can be adjustable. As such, the coupling connection with the columns 604b enable for the support platform 608b and/or the strut 610b to be adjustable as required or desired. In this example, the strut 610b is disposed above the support platform 608b and ties the top ends of the columns 604a together. By forming the columns 604b in an A-shape, piping can be supported on the support platform 608b, and also be hung below as required or desired.

Generally, the components of the pipe support systems described herein are size and shaped (e.g., via the cross-sectional profiles and/or structural shape) to provide load bearing support for the one or more pipes placed thereon. Additionally, the components reduce over tipping of the pipe support system (e.g., during loading of the pipe(s)) and facilitate easy on-site assembly. The cross-sectional profiles of each of the components can be mixed and matched as required or desired from the pipe support systems described herein. For example, the pipe support systems described herein are configured to be field-assembled and adjustable to support one or more pipe(s) installed above an underlying surface (e.g., a roof surface). The pipe supports systems are robust so as to accommodate heavy piping while not tipping over. Additionally, one or more rollers are rotatable around a support platform to enable the piping to be axially moveable (e.g., due to thermal expansion or installation) so that stress induced on the pipes are decreased.

The materials utilized in the pipe supports described herein may be those typically utilized for building hardware component manufacture. Material selection for most of the components may be based on the proposed weight of the pipe, installation conditions, safety guidelines, etc. Appropriate materials may be selected for the pipe supports used on particularly heavy or large pipes, as well as on pipes subject to certain environmental conditions (e.g., moisture, corrosive atmospheres, UV exposure, etc.). Aluminum, steel, stainless steel, zinc, or composite materials can be utilized. Injection molded plastics may be particularly useful.

While there have been described herein what are to be considered exemplary and preferred examples of the present technology, other modifications of the technology will become apparent to those skilled in the art from the teachings herein. The particular methods of manufacture and geometries disclosed herein are exemplary in nature and are not to be considered limiting. It is therefore desired to be secured in the appended claims all such modifications as fall within the spirit and scope of the technology. Accordingly, what is desired to be secured by Letters Patent is the technology as defined and differentiated in the following claims, and all equivalents.

What is claimed is:

1. A pipe support system, comprising:
    a pair of leg supports spaced apart from one another, wherein each of the pair of leg supports comprises an elongated base and a column, wherein the elongated base is coupled to an end of the column and extends in a direction that is substantially orthogonal to the column;
    a strut coupled to each elongated base;
    a support platform coupled to each column of the pair of leg supports and at a height above the strut, wherein the support platform defines a longitudinal axis; and
    one or more rollers coupled to the support platform, wherein the one or more rollers are disposed around the support platform and rotatable around the longitudinal axis, wherein the support platform comprises one or more disks positioned between the columns, and wherein the one or more disks extend radially from the support platform farther than the one or more rollers extend radially from the support platform,
    wherein the one or more rollers comprises a plurality of rollers, wherein the one or more disks comprises a plurality of disks, and wherein the plurality of disks are separate from the plurality of rollers.

2. The pipe support system of claim 1, wherein the strut comprises a threaded rod that threadingly engages a side of each elongated base.

3. The pipe support system of claim 2, wherein the strut is adjustable in length to vary the spacing between the pair of leg supports.

4. The pipe support system of claim 1, wherein the strut is substantially tubular with a substantially circular cross-sectional profile and threaded ends.

5. The pipe support system of claim 1, wherein the support platform is slidingly coupled to each of the columns.

6. The pipe support system of claim 1, wherein the support platform includes two or more sets of apertures to accommodate U-bolts at different locations on the support platform for variable spacing.

* * * * *